Jan. 4, 1955

J. H. GREENWOOD

PLURAL TRACK MAGNETIC RECORDING AND/OR REPRODUCING APPARATUS 2,698,875

Filed March 24, 1950

4 Sheets-Sheet 1

INVENTOR

JAMES H. GREENWOOD,

BY [signature]

ATTORNEY

INVENTOR
JAMES H. GREENWOOD,
BY [signature]
ATTORNEY

INVENTOR.
JAMES H. GREENWOOD
BY
J. Harold Kilcoyne

Input Signal.

Pulse Train to
One Head Assembly.

Condenser Current.

Voltage Across Head
& Condenser.

Recording
Head Current.

Flux in Tape for
Reproduction.

Voltage Generated in
Head by Tape Movement.

Voltage Sample from
One Head.

INVENTOR
JAMES H. GREENWOOD,

BY J. Harold Kilcoyne

ATTORNEY

United States Patent Office 2,698,875

Patented Jan. 4, 1955

2,698,875

PLURAL TRACK MAGNETIC RECORDING AND/OR REPRODUCING APPARATUS

James H. Greenwood, Pittsburgh, Pa., assignor to Magnecord, Inc., Chicago, Ill., a corporation of Illinois Application March 24, 1950, Serial No. 151,775

12 Claims. (Cl. 178—6.6)

The present invention relates to improvements in the art of magnetic recording and/or reproduction of electrical signal currents.

More specifically, the invention contemplates and provides a novel method of and apparatus for the magnetic recording and/or reproduction of an electric signal current of varying magnitude and which may be of a vastly greater frequency range than possible with the existing one-dimensional systems now in use.

According to the invention, and considering the recorder phases thereof, the electric signal current is divided into a series of electric current pulses of varying magnitude which are converted into a pattern on a thin sheet, ordinarily in the form of a strip, tape or the like of magnetizable material, as the sheet is moved over a magnetizing element which can be visualized as a very small electromagnet moving transversely back and forth across the sheet at a speed high in comparison to the speed at which the sheet is moving. The magnetizing flux produced by the energization of the winding of the electromagnet in response to the series of electric current pulses of varying magnitude produces a pattern upon the traveling sheet consisting of magnetized areas or increments, each having an intensity of magnetization and a position on the surface of the sheet bearing a specific relation, respectively, to the two variables of current magnitude and time in the signal being recorded.

In practice, the small moving electromagnet may be replaced by a single stationary magnetizing element extending across the full width of the traveling sheet, and so designed that the magnetizing flux is caused to scan the sheet transversely at high speed. In one typical design, this stationary magnetizing element consists of a large number of individual electromagnets to which the varying electric pulses are fed in some predetermined sequence by a suitable commutating device. While the speed of the traveling sheet may vary with different applications and with different arrangements of the electromagnet heads comprising the magnetizing element, the speed is calculated to provide sheet travel at a rate which prevents overlapping of the successive line-scanning operations.

One of the main advantages of the method and apparatus of the present invention is that it provides a two-dimensional magnetic recording system capable of recording signal currents of vastly greater frequency range than is possible with existing one-dimensional systems now in use. This accrues from the fact that the transverse movement of the magnetic flux of the electromagnet element back and forth across the traveling magnetizable sheet, being electronic, may be made much faster than the highest speed of the traveling sheet.

One application of the invention is in the field of recording television (video) signals for subsequent reproduction. Another application of the invention is in the field of recording military and communication signal currents of a frequency both within the standard video band as well as of frequencies above that band which are considered as falling within the video frequency range.

In such applications, the signal current is divided into a sequence of individual current pulses which are distributed to a multitude of circuits wherein the distributed pulses produce a multitude of subordinate currents of varying magnitude. Preferably, the dividing and distributing is effected by commutating means which also selects the lower predominant frequency components of the subordinate currents having frequencies of the same order of magnitude as the repetition rate of the pulses comprising the subordinate currents. The selected components are fed to the magnetizing element which converts them into a pattern of magnetized areas on the sheet in some predetermined sequence rendering the pattern two dimensional. It will thus be seen that the signal fed to any one electromagnet head will consist of short pulses spaced at relatively long intervals determined by the repetition rate.

Since it is the amplitude of the selected low frequency components of the subordinate currents which carries the information and not the duration thereof, and since the information recorded by any one head can change only at the relatively slow pulse repetition rate, it follows that the highest frequency that need be recorded by any one head is much lower than the corresponding frequency components of the original signal, thus making possible the electromagnetic recording of high frequency electric currents.

There are many ways in which the above may be accomplished, and the following description of one method of recording according to the invention, taken with the accompanying drawings showing one apparatus by which said method may be put into practice, is to be regarded as illustrative only. In said drawings.

Figures 4, 5, 8:
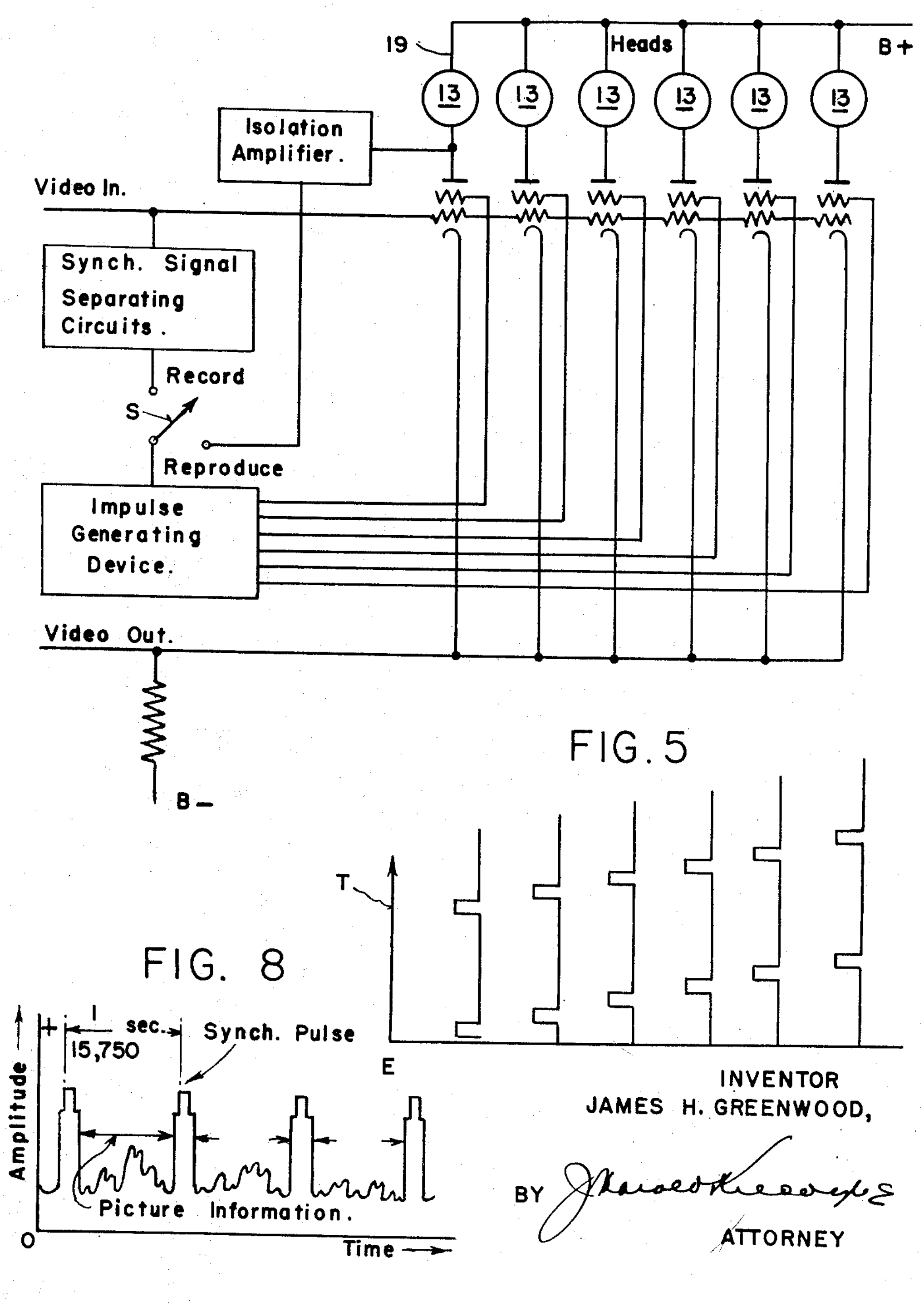
Fig. 4 is a schematic representation of one possible commutating means and circuit arrangement for effecting dividing, distributing and selecting or sampling of the signal current for the various heads in correct predetermined sequence.
Fig. 5 illustrates graphically the time-pulse relationship resulting from commutation aforesaid, of the currents fed to the various heads of the magnetizing elements.
Figure 6:
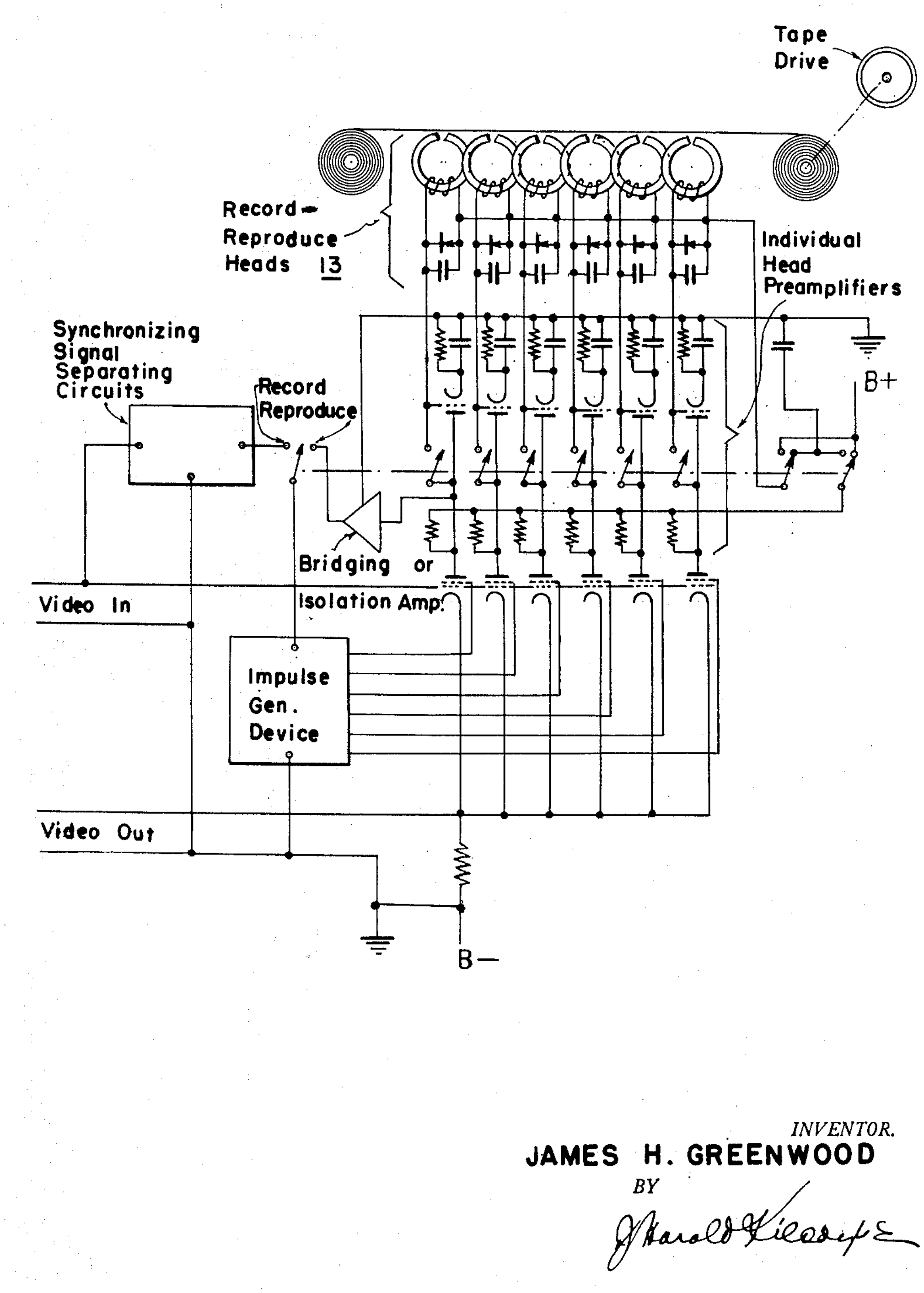
Fig. 6 is a comprehensive diagrammatic view of a complete system for recording on and reproducing from a magnetizable ribbon or tape medium according to the invention.

Figs. *7a–7h*, inclusive, are a series of current and voltage graphs, Figs. *7a–7e* illustrating the wave form of the signal at various points in the system of Fig. 6 when the switch S is in the "Record" position, and Figs. *7f–7h* illustrating the signal voltage at various points of the system of Fig. 6 when the switch S is in the "Reproduce" position; and Fig. 8 is a graph of a typical composite television (video) signal including its synchronizing pulse.

Figure 1:
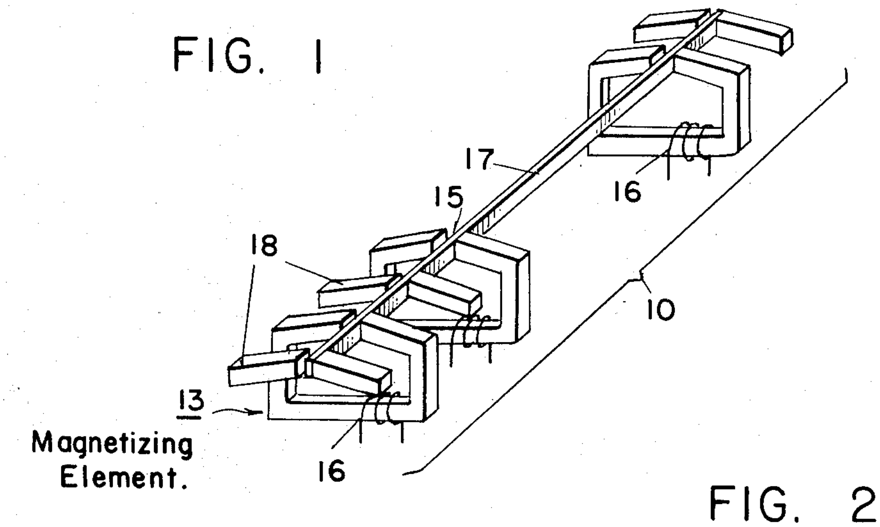
Fig. 1 is a perspective view showing one form of magnetizing element according to the invention, in greatly enlarged detail.

Referring to the drawings (Figs. 1, 2 and 3), a single stationary magnetizing element 10 is shown to extend across the full width of a traveling sheet 11, and arranged so that the magnetizing flux is caused to scan the sheet. The magnetizing element 10 consists of a plurality of individual electromagnets 13 referred to hereinafter as "heads," each individual head 13 consisting of a core 14, made from material suitable for carrying the magnetic flux and which provides a closed magnetic path except for the gap 15, and a winding 16 on the core for producing a flux. The individual heads 13 may be assembled into the magnetizing element 10 as shown in Fig. 1, the individual heads being secured adjacent each other by a conducting but non-magnetic strip 17 passing through all their gaps 15 to form the back-bone of the assembly. Between each pair of adjacent heads 13 and at each end of the assembly are inserted magnetizable spacers 18.

One function of the conducting non-magnetizable strip 17 is to induce the magnetic flux to pass through the magnetizable layer of the sheet 11 rather than directly across the gap 15. The function of the magnetizable spacers 18 is to reduce the fringing of the flux at the edges of the individual heads.

Figure 2:
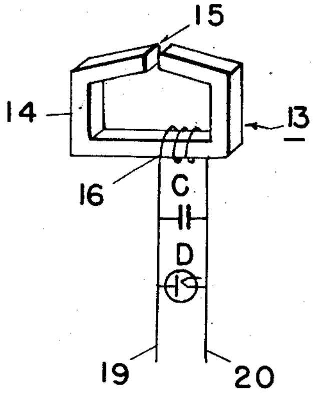
Fig. 2 shows an individual electromagnet of the magnetizing element hereinafter called a "head"
Figure 3:
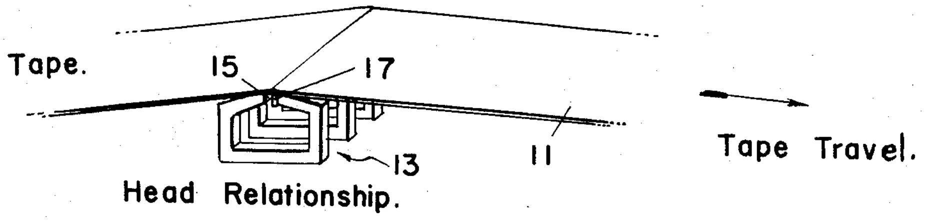
Fig. 3 is a perspective view showing the relationship of a magnetizable sheet, having the form of a ribbon or tape, with respect to the magnetizing element.

With each individual head 13 consisting of a core 14 and a winding 16 as aforesaid, as illustrated in Fig. 2, each winding 16 is shunted by a condenser C and by a diode rectifier D, and the energizing voltage is applied directly across the wires 19 and 20 feeding to each individual head. The functioning of each of these elements will be described hereinafter in connection with the reception of the signal pulses.

With the understanding that the devices symbolized by the reference numeral 13 within a circle each actually comprises a recording head plus its condenser C, rectifier D and winding 16, Fig. 4 illustrates one possible means and method for commutating the signal pulses, in which standard amplifying tubes are used for commutating, i. e. dividing the signal current into a sequence of pulses, distributing the said pulses so as to produce a multitude of subordinate currents of varying magnitude, sampling and selecting the lower predominant frequency components of each subordinate current, and feeding the selected frequency components to the windings 16 of the heads 13 in correct predetermined sequence. The signals for switching the proper tubes "on" and "off" for controlling the circuits to the windings of the heads in predetermined sequence may be obtained from well known binary or other type counting circuits, or from impulse generators, multi-vibrators, delay lines, etc., which, being well known, constitute no part of the present invention as such. By operation of the switch S to the "Record" position, the impulse generator is synchronized to the incoming signal current, which is usually a composite signal including a synchronizing pulse, the synchronizing pulse initiating the impulse generator operation, as is known in the art.

Only six heads are shown in Fig. 4, but any number may be used, depending on the character of the signal desired to be recorded. For purpose of illustration, one commutating tube per head is employed, but other arrangements are possible and equally suitable.

By reference to the Fig. 4 diagram, each commutating tube is shown to consist of four electrodes, including cathode, anode, control grid adjacent the cathode, and a screen grid interposed between the control grid and the anode. As shown, the control grids of each tube are connected in series and receive the incoming signal. The anode of each tube is connected to its corresponding head of the magnetizing element, and each head in turn is connected to a common line leading to the positive B-battery supply. The cathodes of each tube are connected to a common conductor which in turn is connected to the negative B-battery supply through a resistor. The screen grid of each tube is connected to the output of the impulse generator device for supplying the necessary bias to render the tubes either conductive of non-conductive. The wave form of the voltage fed from the impulse generator to the screen grids of the switching tubes is diagrammatically shown in Fig. 5.

Accordingly, it will be seen that as the incoming signal current is fed to the control grids of the tubes, the switching signals supplied by the impulse generator device are distributed in a predetermined sequence to the screen grids of the commutating tubes rendering said tubes conductive in a corresponding predetermined sequence. Therefore, as each commutating tube is rendered conductive by the switching signal, it divides the signal current into a series of pulses, and distributes the pulses to the heads 13. Other well known means for commutating signal pulses, for example, that disclosed in patent to Gray No. 2,250,528, dated July 29, 1941, may be employed for this purpose.

Fig. 6 diagrammatically illustrates a complete record/playback system embodying elements illustrated in Fig. 4 and described above. With the switch S thrown to the "Record" position, the incoming signal is fed to the commutating device which samples the signal and distributes the samples in turn to the pulse lengthening circuits and heads 13. The incoming signal is also fed to synchronizing selecting circuits which control the operation of the commutating device. Usually, and as will be discussed later, television or video signals are a composite of picture information and a synchronizing pulse at regular intervals, such as $\frac{1}{15,750}$ sec. These synchronizing pulses control the operation of the impulse generating device in such a way that samples of the video signal are distributed to all the heads 13 in $\frac{1}{15,750}$ sec., or else in an integral fraction or multiple of that unit of time. The pulses from the commutating device are used to produce a magnetization of the sheet 11 of a duration greater than the pulse duration in a manner which is explained in subsequent paragraphs.

Assuming the incoming signal represents a number of successive single-line scans of an image, the aforesaid action of the commutator, in conjunction with the switching signals from the impulse generator, is to divide the incoming signal current into individual current pulses, each representative of an individual increment of the successive single-line scans which are spaced at intervals corresponding to the time base of the switching wave forms and the line repetition rate. Thus, with the heads disposed in a transverse row, the sequence of pulses to the various heads of the magnetizing element will be progressive along the row of heads, although special applications might utilize other sequences. This in turn results in the recording of a pattern of magnetized areas on the traveling sheet which extends across the width of the sheet, with each magnetizing area having an intensity of magnetization and a position on the sheet which are related in a specific manner, respectively, to the two variables of current magnitude and of time in the signal being recorded.

Since electric currents of all frequencies from the maximum in the video frequency range down to and including zero C. P. S. may be recorded in the manner described above, one obvious but not the only possible application of this invention is in the field of recording television (video) signals for subsequent reproduction.

As is well known, the present United States standards for television require 525 horizontal lines per complete picture or frame, each complete picture to be scanned at 30 frames (times) per second, giving a scanning or repetition rate of 15,750 lines per second. Since the television or video signal contains a synchronizing pulse, usually at the end of each line of scan, it will be seen that a synchronizing pulse is transmitted at the aforesaid repetition rate of $\frac{1}{15,750}$ per sec.

The counting circuits, impulse generators or multivibrators are synchronized to the composite video signal as it would be transmitted, the synchronizing pulses of the signal furnishing the pulses necessary for initiating the operation of the impulse generator which in turn provides the switching signals necessary for commutation, as aforesaid, which latter feed the current pulses of the video signal to the winding 16 of each head in the proper sequence and repetition rate. The winding 16 of each head and the associated condenser C which shunts the winding are tuned to a frequency corresponding to the aforesaid line repetition rate of 15,750 C. P. S.

For the recording of television signals, the number of electromagnet heads 13 constituting the magnetizing element 10 would, in general, equal the required number of picture increments per horizontal line and, for the purpose of the present description, will be assumed as 500. Each head 13 of the 500 heads constituting the magnetizing element 10 will receive an impulse every $\frac{1}{15,750}$ of a second, resulting in 7,875,000 pulses per second handled by the magnetizing element 10. It is to be noted that these are pulses and not cycles. Therefore, the pulse to each head must not be longer than $\frac{1}{7,875,000}$ of a second, but it may be shorter.

During the $\frac{1}{7,875,000}$ of a second that the commutating device maintains the circuit completed to a given head 13, a pulse is fed to that particular head. However, such is not a measure of the time that the winding 16 of said head is energized, as shown by the following analysis: The commutating device controlled by the switching signals from the impulse generator, whose operation has been initiated by the synchronizing pulse of the video signal, distributes the pulses progressively and in the proper sequence to the 500 heads of the magnetizing element. When a pulse arrives at a given head 13 in its proper sequence, it charges the condenser C, which immediately begins to discharge through the winding 16. Due to the inductive nature of the head, the discharge of the condenser C through the head will consume a much longer time than the $\frac{1}{7,875,000}$ of a second in which the condenser became charged. As a consequence of this current flowing through the winding of the head, a magnetic flux is established which is induced by the strip 17 to flow through the sheet in the core 14 crossing the gap 15 thereof, and hence producing magnetization in the sheet of a magnitude comparable to the amplitude of the energizing pulse and of a time duration significantly longer than the duration of the pulse from the commutating device. Pulse-lengthening as achieved by the described arrangement and the aforesaid functioning of condenser, rectifier and recording head is clearly shown in the graphs of Figs. 7*a*–7*e* inclusive. Since winding 16 and condenser C are resonant at 15,750 C. P. S., they will tend to oscillate at that frequency but will be restrained after the first half cycle by the diode rectifier D, whose polarity is such that it will not conduct the initial pulse but will conduct any current that tends to flow in the opposite direction.

In light of the above, and remembering that any two pulses to the winding 16 of a given head 13 are spaced 1/15,750 of a second apart, it will be seen that for approximately the first half of this time there is a magnetizing current flowing in the winding 16 of the head, and virtually no current for the remaining time. The amplitude of the magnetizing current flowing in winding 16 is determined by the amplitude of the pulse and, since it is the amplitude of the current pulse which carries the information, and not its duration, it follows that the signal recorded by any one head then becomes an amplitude modulated 15,750 C. P. S. carrier. This is another way of saying that the highest frequency which need be recorded by any one head 13 is much lower than the maximum frequency component of the original video signal. Accordingly, the pattern of the magnetization on the sheet will be that of the picture or information or intelligence contained in the video signal, this despite the very high frequency of the original video signal and the limitations of electromagnet means in recording such high frequency signals.

The aforesaid feature of increasing the time duration of the recorded pulses is noteworthy in that it reduces the maximum frequency requirement of each one of the recording heads 13. Moreover, by having increased the time duration and thereby the physical magnitude of the recorded pulses, the synchronization during reproduction is made relatively uncritical. While the pulse-lengthening means illustrated, using a capacitor (condenser C) and a rectifier (diode D), in conjunction with each of the recording heads 13, is the preferred means, it will be well understood by persons skilled in the art that such is not the only means which could be employed for lengthening pulses. For example, a pulse-lengthening means which could be used is described on page 94 of the American Institute of Electrical Engineers Transactions for 1949, included in article entitled "A Time Division Multiplexing System," by W. P. Boothroyd and E. M. Creamer, beginning on page 92.

The low frequencies down to and including zero C. P. S. may also be recorded in a similar manner. In the latter case, however, the pulses from the commutator will all be the same amplitude, but the pulses fed to the individual heads 13 will contain frequency components at the commutation rate and thus may be recorded.

Moreover, the invention makes possible the recording of coded or secret military and communications information and intelligence at frequencies below, within and above the standard video band, the higher frequencies being commonly referred to as falling within the video frequency range, since, as above explained, only selected pulses at the predominant low frequencies are employed for recording purposes. This latter can be achieved by commutating the signal current containing the information or intelligence in a sequence in which the magnetized areas are "scrambled" rather than being arranged in a progressive sequence, with decoding being effected in or through reproduction.

Reproduction for delayed broadcast or for any other purpose desired may be as follows: Reference being had to Figs. 4 and 6 (with the switch S in the "Reproduce" position) the magnetized sheet 11 is caused to move across a magnetizing element, which may be the element 10 employed for recording or an identical element, at the same speed as during recording. As the magnetized areas of the sheet move across the gap 15 of the individual heads 13, currents are generated in the windings 16 of the heads. As in the case of recording, these currents are also in the form of an amplitude modulated 15,750 C. P. S. carrier (for television signals) and each current is rectified by the diode rectifier D of a head, leaving a charge on the condenser C which is related to the amplitude of the modulation. The currents generated in the several heads 13 may, if desired, be separately amplified before they are fed to the commutating device, and accordingly individual head amplifiers have been illustrated in Fig. 6 since anyone skilled in the particular art would automatically supply them in view of the low signal level in the heads during playback. The commutating system may be identical with that used during the recording, with the exception that it is now synchronized with the signal on the sheet. This is accomplished in Figs. 4 and 6 as the result of throwing the switch S to the "Reproduce" (playback) position. In this position, the head which reproduces the synchronizing signal through an isolation amplifier controls the impulse generator (Fig. 4) or the commutating device (Fig. 6) so that the commutation is maintained in synchronism with the signal reproduced from the moving sheet. It will be noted that during playback the pulse lengthening means is retained since it does not affect the described operation. In explanation, each pulse lengthening circuit as described above for the recording operation lengthens a 1/7,875,000 sec. pulse to a half-cycle of a 15,750 C. P. S. signal. The length of the "lengthened" pulse bears no relation to the original length of the pulse, being, instead, a function of the resonant frequency of the capacitor C and the inductance of the head winding. Any pulse length equal to or shorter than a half-cycle of a 15,750 C. P. S. signal will be lengthened to approximately a half-cycle of a 15,750 C. P. S. signal. During playback, the movement of the magnetized sheet generates in the winding of the head a series of pulses, each transmitting a half-cycle of a 15,750 C. P. S. signal. These pulses are not lengthened since they are already the maximum size to which any pulse may be lengthened; or, in other words, since the head and capacitor are resonant to pulses of this size and repetition rate.

Figure 7A:
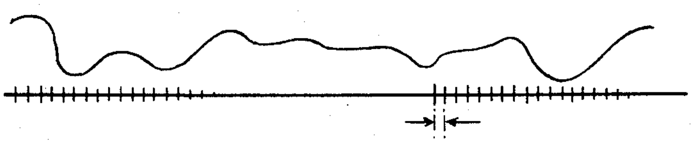
Figure 7B:
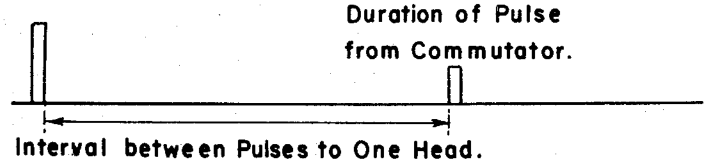
Figure 7C:
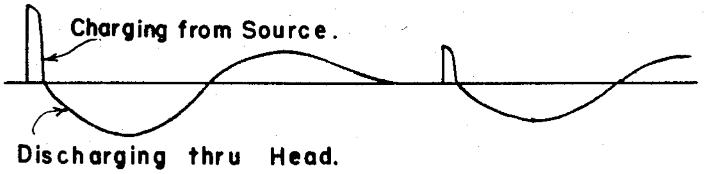
Figure 7D:
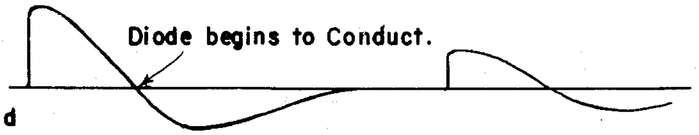
Figure 7E:
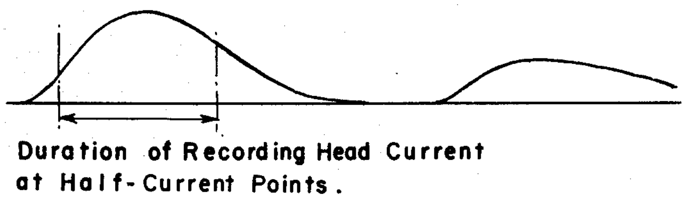
Figure 7F:
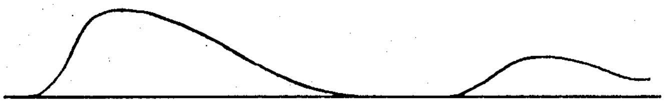
Figure 7G:
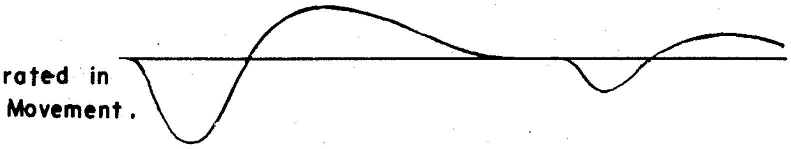
Figure 7H:
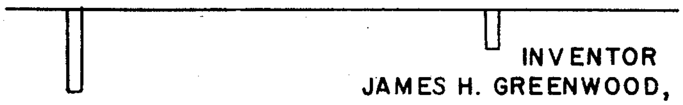

Figs. 7*f*–7*h*, inclusive, illustrate graphically the signal being reproduced at various points of the system, with the switch S thrown to "Reproduce" position. One channel only is illustrated, but it will be understood that the output signal results from combining in sequence the samples from all channels.

Reverting to Fig. 6, and with the switch S set to "Reproduce" position as aforesaid, the synchronizing pulse is taken from the head (which is the same or an equivalently positioned head as that employed to record the synchronizing pulses) and fed through an isolation amplifier to the commutating device. During the 1/7,875,000 of a second that the circuit is completed to a given head by the commutating device, condenser C is discharged through a video output circuit. Thus the reproduced signal from the several heads is re-combined in the same sequence as it was recorded and the combined output signal becomes a reproduction of the input signal before commutation. By suitable equalization and refinement, the output signal may be made as nearly identical to the input signal as is desired. Many of the signals other than television which are of a similar frequency range and which, therefore, can also be recorded by the present system, are repetitive in nature (radar, loran, etc.), and contain pulses at regular intervals which serve to synchronize the commutating switch both during recording and reproduction, in the same manner as the synchronizing pulses of the composite video signal. When signals of a completely random nature are being recorded, a similar series of periodic pulses is generated and recorded for the purpose of synchronizing the action of the commutating switch during recording and reproduction or play-back.

Without further analysis, it will be appreciated from the aforesaid description that the invention makes possible the two-dimensional magnetic recording on and/or reproducing from a single sheet such as a tape, ribbon or the like, of an electric signal current of varying magnitude and of unlimited range in contrast to the existing one-dimensional systems now in use. This is made possible, in face of the known limitations of electromagnet recording and reproducing means, through the use of a multitude of electromagnet heads to which are fed only selected low frequency components of the high frequency incoming signal current. In the case of the extremely low frequency signals (down to zero C. P. S.), the pulses fed to the individual heads will be of the same amplitude, but will contain frequency components at the commutation rate which are recordable and reproducible.

As many changes could be made in carrying out the above described methods and constructions without departing from the scope of the invention, it is intended that all matter contained in the above description or shown in the accompanying drawings shall be interpreted as illustrative and not in a limiting sense.

I claim:

1. A signal recording system comprising a source of image signals, a magnetizable recording medium in the form of a strip, means for moving said recording medium in the direction of its length, a plurality of recording devices arranged transversely of said recording medium, said recording devices each including a head, an energizing winding and pulse lengthening means connected across said winding, and means for sampling the signal at a frequency greater than the highest frequency in the signal and for distributing the samples in the form of current pulses and in sequence directly to the windings of said recording devices.

2. A signal recording system as set forth in claim 1, wherein said pulse lengthening means comprises a capacitor and a rectifier connected in parallel.

3. A signal recording system comprising a source of image signals, a magnetizable recording medium in the form of a strip, means for moving said recording medium in the direction of its length, a plurality of recording devices arranged transversely of said recording medium, each including energizing means adapted when energized to effect magnetization of a predetermined area of said recording medium, means for sampling the signal at a frequency greater than the highest frequency in the signal and for distributing said samples in sequence to said energizing means as current pulses of short duration, and means associated with each of said recording devices for lengthening the duration of energization of said energizing means as compared to the duration of said current pulses.

4. A signal recording system comprising a source of image signals, a magnetizable recording medium in the form of a strip, means for moving said recording medium in the direction of its length, a plurality of recording devices arranged transversely of said recording medium, said recording devices having individual energizing circuits adapted when energized to effect magnetization of predetermined areas of said recording medium, means for sampling the signal at a frequency greater than the highest frequency in the signal and for distributing said samples in sequence to said energizing means as current pulses of short duration, and pulse lengthening means connected in each of said energizing circuits for lengthening the duration of energization thereof as compared to the duration of said current pulses.

5. A signal recording system as set forth in claim 4, wherein said pulse lengthening means comprises a capacitor and a rectifier connected across each of said energizing circuits.

6. A signal recording system comprising a source of signals, a magnetizable recording medium in the form of a strip, means for moving the recording medium in a predetermined direction, a plurality of recording devices arranged transversely to the direction of motion of the recording medium, each recording device having means for magnetizing the recording medium, a condenser connected across each of the recording devices, a rectifier connected across each of the recording devices, a plurality of electronic valves connecting the signal source to the several recording devices, and means for causing the electronic valves to connect the signal source in sequence to the several recording devices whereby the recording devices are energized by the input signal.

7. A signal recording system comprising a source of signals, a magnetizable recording medium in the form of a strip, means for moving the recording medium in a predetermined direction, a plurality of recording devices arranged transversely to the direction of motion of the recording medium, each recording device having means for magnetizing the recording medium, a condenser connected across each of the recording devices, a rectifier connected across each of the recording devices, and a switch for connecting the signal source in sequence to the several recording devices whereby the recording devices are energized by the input signal.

8. A signal recording system comprising a source of image signals, a magnetizable recording medium in the form of a strip, means for moving the recording medium in a predetermined direction, a plurality of recording devices arranged transversely to the direction of motion of the recording medium, each recording device having means for magnetizing the recording medium, a condenser connected across each of the recording devices, a rectifier connected across each of the recording devices, a switch for connecting the said image signal source in sequence to the several recording devices whereby the recording devices are energized from the signal source, and means for operating the switch in synchronism with the said image signal.

9. A signal recording system comprising a source of image signals, a magnetizable recording medium in the form of a strip, means for moving the recording medium in a predetermined direction, a plurality of recording devices arranged transversely to the direction of motion of the recording medium, each recording device having means for magnetizing the recording medium, a condenser connected across each of the recording devices, a rectifier connected across each of the recording devices, a plurality of electronic valves connecting the image signal to the several recording devices, and means for causing the electronic valves to connect the image signal to the several recording devices in sequence and in synchronism with the said image signal whereby the recording devices are energized from the signal source.

10. A signal recording system comprising a source of signals, a magnetizable recording medium in the form of a strip, means for moving the recording medium in a direction parallel to its length, a plurality of recording devices arranged transversely to the direction of motion of the recording medium, each recording device having means for magnetizing the recording medium, a condenser connected across each of the recording devices, a rectifier connected across each of the recording devices, a switch for connecting the signal source in sequence to the several recording devices whereby the recording devices are energized from the signal source, and means for operating the switch at a predetermined rate.

11. A signal reproducing system comprising a magnetic recording medium having width and length and capable of storing a signal in the form of a varying flux, means for moving the recording medium in a predetermined direction, a plurality of pickup devices arranged transversely to the direction of motion of the recording medium, each pickup device having an electrical circuit and means for generating a current in the electrical circuit in response to changes in flux in the recording medium, an output circuit, a plurality of electronic valves, each of said electrical circuits being connected to one of said valves, and all of said valves being connected to said output circuit, and means for causing the electronic valves to connect the electrical circuits in sequence to the output circuit whereby said output circuit is energized in sequence by the currents in the several electrical circuits.

12. A signal reproducing system comprising a magnetic medium having width and length and capable of storing a signal in the form of a varying flux, means for moving the recording medium in a predetermined direction, a plurality of pickup devices arranged transversely to the direction of motion of the recording medium, each pickup device having an electrical circuit and means for generating a current in the electrical circuit in response to changes in flux in the recording medium, an output circuit, a plurality of electronic valves, each of said electrical circuits being connected to one of said valves, and all of said valves being connected to said output circuit, and means for causing the electronic valves to connect the several electric circuits to the output circuit in sequence and in synchronism with at least a portion of the signal recorded on the recording medium whereby said output circuit is enegrized in sequence by the currents in the several electrical circuits.

References Cited in the file of this patent

UNITED STATES PATENTS

| | | |
|---|---|---|
| 1,945,626 | Baird | Feb. 6, 1934 |
| 1,974,911 | Buecker et al. | Sept. 25, 1934 |
| 2,213,246 | Heller | Sept. 3, 1940 |
| 2,361,752 | Eilenberger | Oct. 31, 1944 |
| 2,468,601 | Long | Apr. 26, 1949 |
| 2,479,308 | Camras | Aug. 16, 1949 |
| 2,514,578 | Heller et al. | July 11, 1950 |
| 2,517,808 | Sziklai | Aug. 8, 1950 |